(12) United States Patent
Rowe et al.

(10) Patent No.: US 9,148,425 B2
(45) Date of Patent: Sep. 29, 2015

(54) SECOND SCREEN MEDIATION (71) Applicant: Oracle International Corporation, Redwood Shores, CA (US)

(72) Inventors: Erick Rowe, Chaska, MN (US); John E. Yopp, Minneapolis, MN (US); Mark Schwans, Rosemount, MN (US)

(73) Assignee: Oracle International Corporation, Redwood Shores, CA (US)

( * ) Notice: Subject to any disclaimer, the term of this patent is extended or adjusted under 35 U.S.C. 154(b) by 182 days.

(21) Appl. No.: 13/975,042

(22) Filed: Aug. 23, 2013

(65) Prior Publication Data
US 2015/0058927 A1    Feb. 26, 2015

(51) Int. Cl.
*G06F 7/04* (2006.01)
*H04L 29/06* (2006.01)

(52) U.S. Cl.
CPC ............ *H04L 63/0869* (2013.01); *H04L 63/08* (2013.01)

(58) Field of Classification Search
CPC ..... H04L 63/04; H04L 63/10; H04L 63/0428; H04W 12/06; H04W 12/08
See application file for complete search history.

(56) References Cited

U.S. PATENT DOCUMENTS

| 8,482,543 | B2 | 7/2013 | Mundt et al. |
| 2011/0029774 | A1* | 2/2011 | Zunke ........................... 713/168 |
| 2011/0276661 | A1* | 11/2011 | Gujarathi et al. ............. 709/219 |
| 2012/0210349 | A1 | 8/2012 | Campana et al. |
| 2012/0215925 | A1* | 8/2012 | Seshadri et al. .............. 709/226 |
| 2013/0111514 | A1 | 5/2013 | Slavin et al. |
| 2013/0152139 | A1 | 6/2013 | Davis et al. |
| 2013/0174188 | A1* | 7/2013 | Gagnon et al. .................. 725/13 |
| 2014/0317410 | A1* | 10/2014 | Yamaguchi et al. .......... 713/171 |

* cited by examiner

*Primary Examiner* — Fikremariam A Yalew
(74) *Attorney, Agent, or Firm* — Miles & Stockbridge P.C.

(57) ABSTRACT

A system authenticates a first session for a first application running on a workstation and a second session for a second application running on a second screen device. The system links the first application to the second application when the first session matches the second session. The system receives data indicating the linked first application was changed at the workstation and provides update data to the second application corresponding to the change in the linked workstation application, causing a display of the second screen device to update based on the update data.

18 Claims, 5 Drawing Sheets

SECOND SCREEN MEDIATION

FIELD

One embodiment is directed generally to a mediation service, and in particular to mediation service for managing information on a second screen.

BACKGROUND INFORMATION

As businesses rely more on software for their workflows and business decisions, software user interfaces have become crowded and complex. Display screens have become inundated with burgeoning business workflows with additional steps for more roles and more scenarios, data fields for each rare use case, and in-context reports and impact analyses reflecting ever-broadening sets of data gathered by business intelligence and analytics tools. This is in addition to the multiple applications, whether integrated or not, that need to be used simultaneously to complete a task. Corporate software users are facing a distracting amount of information on a single screen, something that has been handled by sectioning the screen into areas of interest, dividing information into relevant tabs, or adding additional display monitors to the system. In all of these solutions, the same general interface is used to interact with the data, e.g., a mouse and keyboard.

Further, the modern computer user has become comfortable with, and adept at, using a personal mobile device to augment daily tasks. Smartphones and tablets have considerable computing power and ubiquity, to the point that they are replacing the personal computer for many tasks. The explosive growth of, and reliance on, mobile devices has made them a common sight in people's hands while, for example, waiting in line, riding a bus, conversing with others, or glancing at a newsfeed or the clock. Mobile devices have become one way to augment people's daily lives and tasks with information. For example, during family television viewing some may have a mobile device on hand for either keeping abreast of unrelated information during television programming lulls, or for expanded data about what is being watched, such as reading Twitter feeds while watching coverage of an election night or natural disaster for commentary and immediate updates. This use of mobile devices to augment television viewing has been called the "second screen" phenomenon, and some programs and channels have leveraged it to provide an application with synchronized data that augments what the viewer is watching.

SUMMARY

In one embodiment a system authenticates a first session for a first application running on a workstation and a second session for a second application running on a second screen device. The system links the first application to the second application when the first session matches the second session. The system receives data indicating the linked first application was changed at the workstation and provides update data to the second application corresponding to the change in the linked workstation application, causing a display of the second screen device to update based on the update data.

DETAILED DESCRIPTION

Similar to many applications, typically when enterprise users interface with business intelligence ("BI") for analysis, auxiliary information may be provided on a single computer system with one or two displays, with some the auxiliary information hidden behind tabs. This arrangement clutters the workstation data view, distracting the user's focus, while possibly de-emphasizing high priority information by placing it alongside secondary information. This arrangement can also hide information in tabs that is actually required viewing for the current screen.

Consequently, one embodiment manages a second screen mediation between a workstation computer having local monitors and a portable device to provide BI data to a user. The second screen mediation service links applications running on the workstation computer to the portable device. Once authenticated, the workstation computer may initiate a second screen session to transfer linked application information from the workstation computer via second screen mediation to the second screen for viewing and manipulation. Bi-directional communication between the workstation computer and portable device may be maintained by a second screen mediation service for keeping linked application information current on each device. For example, when a user on a workstation computer edits information, the edited information will become available to the second screen device. Thus, in one embodiment, the workstation screen is de-cluttered by moving auxiliary information to a linked and synchronized mobile device application in a second screen application. The workstation screen may be returned to focus on the core of the current task, while still benefiting from the immediate availability of enhanced information and activity through the mobile device.

Figure 1:
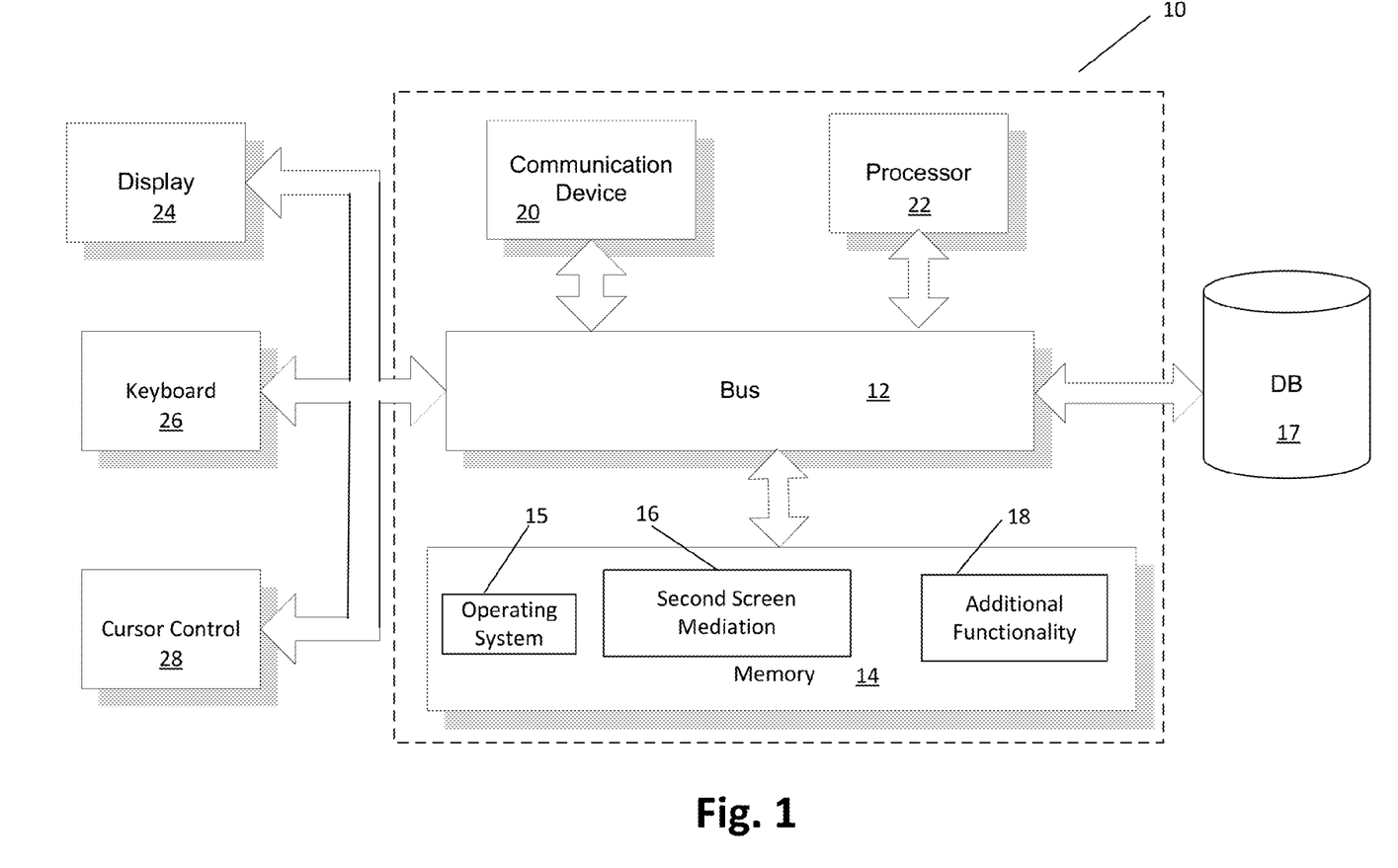
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a second screen mediation module 16 that provides and processes second screen data, as disclosed in more detail below. System 10 can be part of a larger system, such as a database management system or business intelligence platform. Therefore, system 10 may include one or more additional functional modules 18 to include the additional functionality. A database 17 is coupled to bus 12 to provide centralized storage for modules 16 and 18 and store one or more data sets to support second screen processing, etc. Some embodiments may not include all of the elements in FIG. 1.

One embodiment enables a user to delegate information displayed on a primary device, such as a workstation, to an independent second device, such as a portable or mobile tablet or smart phone. Such information may be maintained and synchronized between the primary device and second device via a mediation service. System 10 of FIG. 1 can implement the workstation, the second device, and/or the mediation service.

For example, a user may analyze a retail planning workflow where in-context business intelligence, such as a report, would help the user make decisions on ordering via a user order interface. Instead of placing the report on the workstation screen, using second screen integration the report may automatically appear on the user's tablet, pre-loaded with the correct data that relates to the specific vendor and department already entered on the workstation.

In another example, a user may create an order on a workstation, but then realize that a new item is needed to be created before the order can be completed. Rather than exiting that application to go into another application, the user could turn to a tablet computer which has a quick item create workflow available as an option for this workstation screen, with the vendor already populated using information from the order entry.

In another example, a user could swap screens so that the tablet holds the screen previously on the workstation and vice versa. The user could then bring the tablet to a meeting or other collaboration and have the workstation screens available on the portable device. The user may then log into an a presentation workstation available in the meeting room and use the meeting room workstation as a second screen to the tablet or swap screens back to the meeting room workstation and use that as the primary interface.

Figure 2:
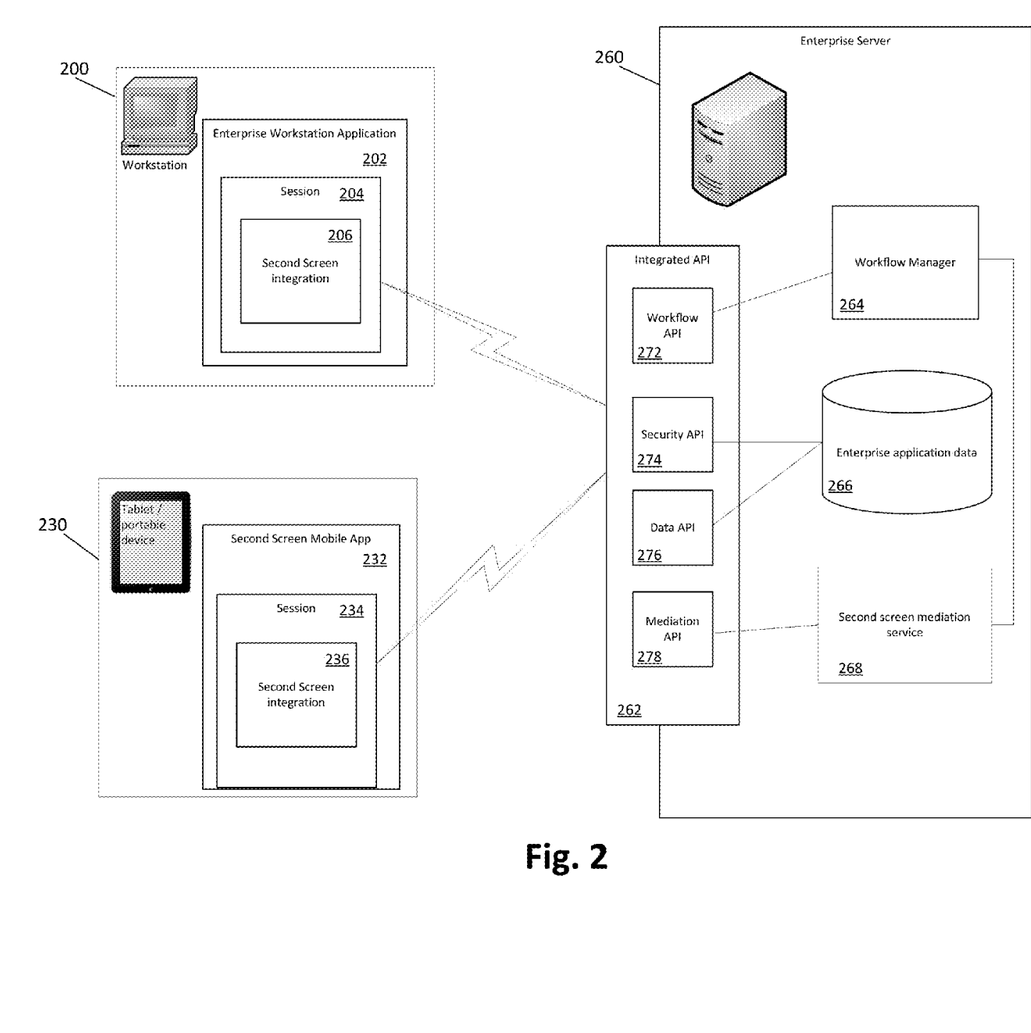
FIG. 2 illustrates a system in accordance with one embodiment.

FIG. 2 illustrates a system in accordance with one embodiment. A workstation 200 runs enterprise workstation application 202 for providing data and workflows, and providing productivity tools and interfaces. Workstation 200 may be a device run inside or outside an organization's network security perimeter, such as a firewall. If running inside, typically a direct access network interface via cable would be used, but a wireless interface may be used also. If running outside, typically the workstation would access an organization's internal or secured network via a virtual private network ("VPN") interface. A VPN interface typically provides an encrypted connection to a private network independent of an application accessing the network. However, if running outside an organization's network security perimeter, applications accessing the organization's network may incorporate other forms of data security. For example, in some embodiments, application 202 may use public key/private key encryption to access data of an encrypted network connection. In other embodiments, application 202 may not use any encryption.

Application 202 may provide workflow information on multiple displays or tabs related to making business decisions. In some embodiments application 202 may launch other applications for viewing information, such as a document viewer or web browser. In some embodiments, application 202 may include locally stored data and functionality for operating independently from a server system, and off site data may be available via remote access from a server 260, for example, such data including real-time data, updated data, or supporting data. Application 202 may integrate support for a second screen application on a mobile device. In some embodiments, application 202 may provide selection buttons to launch or move data displayed in selected tabs to a second screen. In some embodiments, application 202 may launch some related data on a linked second screen automatically without any specific selection. In some embodiments, application 202 may also offer an option to fully swap the display between a second screen device and workstation 200.

Enterprise application 202 runs session 204 that connects to server 260 and manages data between workstation 200 and server 260. Data management provided by session 204 includes managing security for accessing server 260 as well as providing an interface for data transmission and reception to and from server 260. Session 204 may provide data management for other data sources as well. Session 204 includes navigation and state information for tracking a user's activities and data changes in enterprise application 202

Session 204 also contains program data to support second screen integration 206 logic and interface. Second screen integration 206 provides an interface to server 260; the interface passes data to and from session 204 and server 260. Second screen integration 206 also provides a reporting framework at defined points in the application flow, such as during login, menu actions, page loads, and field entry. Any changes to application 202 screens, navigation, security, and session may be sent to a mediation service on server 260 for tracking the state of application 202.

A tablet or portable device 230 runs second screen mobile application 232, and functions as the second screen. Device 230 would typically be a wireless device communicating data over a wireless data network, such as a WiFi or cellular based data network. Similar to workstation 200, device 230 may be located inside or outside an organization's network security perimeter and may use VPN or other security options as necessary to communicate with server 260.

Second screen application 232 is run locally on device 230. Although second screen application 232 may contain some localized data for operation, such as configuration data, typically application 232 would not contain data for independent operation. Optionally, application 232 may store data locally for offline independent operation. Second screen application 232 includes central mappings of screens and screen events of a linked workstation application, mapped to screens on enterprise workstation application 202. Second screen application 232 includes user interfaces to display data or interaction flows relying primarily on data used by one or more existing enterprise applications, e.g. data will typically populate from either a server housing the data or from linked application 202. In some embodiments, once linked to enterprise application 202, second screen application 232 may automatically provide screen display options based on the screen currently being displayed on workstation 200. For example, if enterprise application 202 is an ordering application, once linked second screen application 232 may display options for order tracking, item entry, invoicing, and the like. Further, these display options may be prepopulated to work within the context from application 202, such as a particular storefront, order category, and the like. In some embodiments application 232 may also offer an option to fully swap the display between device 230 and workstation 200.

Second screen application 232 receives event notifications for updates in enterprise application 202, and in turn can launch appropriate data collection and visual rendering modules based on linked session information and the screen mappings. In some embodiments, application 232 relies on central security access to provide appropriate user control. For example, application 232 may authenticate a user via VPN access, as discussed above. Optionally, authentication may also include role-based control defining which mobile screens map to which workstation screens depending on the defined role assigned to the authenticated user.

Second screen application 232 runs session 234 that connects to server 260 and manages data between device 230 and server 260. Similar to workstation 230, data management provided by session 234 includes managing security for accessing server 260 as well as providing an interface for data transmission and reception to and from server 260. Session 234 may provide data management for other data sources as well. Session 234 includes navigation and state information for tracking a user's activities and data changes in second screen application 232.

Session 234 also contains program data to support second screen integration 236 logic and interface. As described in further detail in the discussion below, second screen integration logic 236 provides an interface to server 260 for receiving display commands and data related to application data viewed on workstation 200. Second screen integration 236 also provides a reporting framework at defined points in the flow of second screen application 232, such as during login, menu actions, page loads, and field entry. Any changes to application 232 screens, navigation, security, and session may be sent to a mediation service on server 260 for tracking the state of application 232.

Enterprise server 260 provides integrated application programming interface ("API") 262. Integrated API 262 provides defined programming interfaces into systems located on server 260. Server 260 provides workflow manager 264. Workflow manager 264 receives and responds to session data from sessions 204 and 234. Workflow manager 264 provides the logic in server 260 to process specific requests and provide responses. For example, workflow manager 264 may receive a request for reporting data over the last quarter for a business sector. Workflow manager 264 would process the request and provide a formatted response. In a typical use, workflow manager 264 also coordinates with application 202 through a Business Process Execution Language ("BPEL") module so that no dependency or financial safeguard issues occur, such as Sarbanes-Oxley ("SOX") accounting and data requirements.

Server 260 houses enterprise application data 266 which includes data gathered for processing for business intelligence analysis and use (e.g., an Enterprise Resource Planning ("ERP") system). For example, detailed business intelligence data and reports may be used, such as those provided by "Oracle Retail Business Intelligence" from Oracle Corporation. Application data 266 is used by workflow manager 264 to respond to requests from workstation 200 or device 230.

Server 260 also runs second screen mediation service 268 which provides logic for interacting with workflow manager 264 to provide mediation between enterprise application 202 and second screen application 232. Mediation service 268 may also store data to support second screen mediation, such as second screen state, action, navigation, and data change information for workstation 200 and device 230. Mediation service 268 may run on an organization's server, such as server 260, and be accessible through the organization's network. Enterprise application 202 and second screen application 232 can register with mediation service 268 each time they were instantiated, linking workstation 200 and device 230. Session information such as data entry and navigation can pass bi-directionally between the linked enterprise application 202 and second screen application 232 through session mediation service 268 so that both enterprise applications running on workstation 200 and second screen applications running on mobile device 230 are aware of the state of each linked application, e.g., where the user is on each linked application and what the user is doing on each application.

Workflow manager 264 and second screen mediation service 268 work together to provide data for the second screen application 232 on device 230. Workflow manager 264 may provide enterprise application 202 with screen mappings and options for integrating application 202 to second screen device 230. For example, manager 264 may define that for an ordering application, second screens may be available for item entry, order management, order tracking, and the like. For a sales forecasting application, manager 264 may define that second screens may be available for predictive charts, interface elements to adjust predictive baseline assumptions, historic prediction versus realization, and the like. By linking the screen in workstation 200 with device 230, data from each screen may prepopulate in the second screen or may be used for calculations in the second screen.

In some embodiments, notification between enterprise application 202 and second screen application 232 may be accomplished by a "push" notification by second screen integration module 206 or 236, which can notify mediation service 268 proactively each time a change is made in the state of linked enterprise application 203 or second screen application 232. Mediation service 268, in turn, can notify the non-originating device of the change. In some embodiments, notification between application 202 and application 232 may be accomplished by a "publish and subscribe" notification system, which would publish changes to mediation service 268, and be noticed by the other linked application 202 or application 232 through a subscription service. Through notification, as relevant events occur, linked enterprise application 202 or second screen application 232 may be immediately notified. In some embodiments, notifications may be immediate and single time only. In some embodiments, notification delivery need not be guaranteed or in a controlled sequence, and in other embodiments, a notification delivery verification may be used to verify a notification was delivered to or picked up by the non-originating device. Such verifications may be accomplished using known techniques and may provide a higher degree of reliability for second screen integration. In some embodiments, verification of notification may be a configurable setting to enable or disable verification depending on the reliability tolerance of the specific use.

Integrated API 262 supplies interface elements for interfacing with workstation 200 and portable device 230. Workflow API 272 provides an interface to workflow manager 264. Session 204 on workstation 200 and session 234 on device 230 may make programming calls to workflow API 272 to store or retrieve data in server 260. Security API 274 provides an interface to application data 266 related to the implementation of security measures for accessing the data housed in application data 266 and other access to server 260. For example, security API 274 may provide an interface to programming calls made from session 204 on workstation 200 and session 234 on device 230 for authenticating a user, such as a username and password. Data API 276 also provides an interface for accessing application data 266. Through data API 276, using programmatic API calls session 204 on workstation 200 and session 234 on device 230 may access application data 266. Mediation API 278 provides an interface to mediation service 268 for providing second screen mediation between workstation 200 and portable device 230. Such information may include information associated with workflows displayed on workstation 200 and corresponding related information displayed on device 230. For example, through mediation API 278, second screen integration 206 and 236 may update the state of enterprise application 202 and second screen application 232 to keep data synchronized between the two devices.

Workstation 200, device 230, and server 260 are each computer systems consistent with the description corresponding to FIG. 1. Thus, each of workstation 200, device 230, and server 260 may be implemented via a distributed system. Further, multiple workstations 200, devices 230, and servers 260 may be used to provide additional screens for a session.

Figure 3:
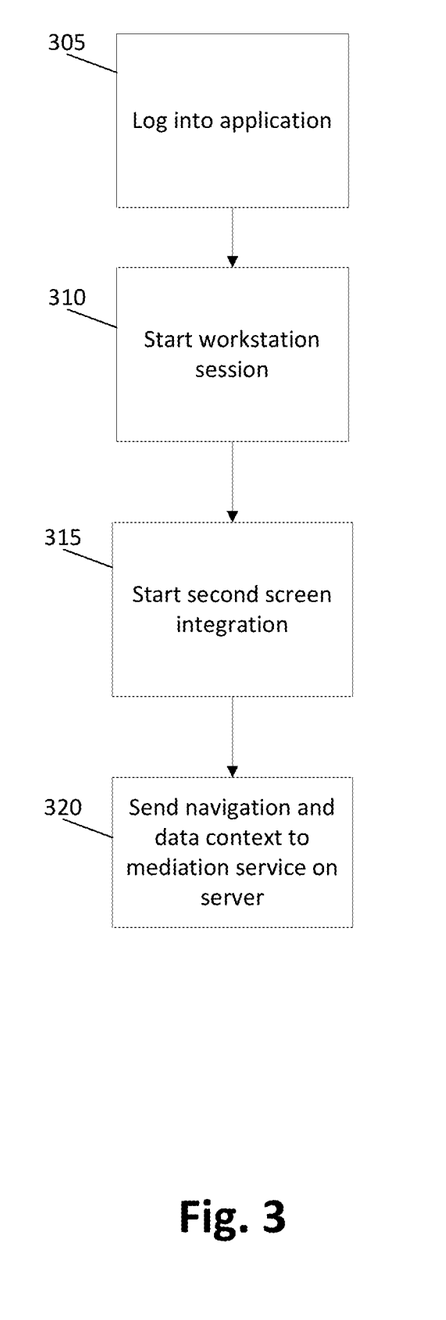
FIG. 3 is a flow diagram for second screen mediation on a workstation in accordance with some embodiments.

FIG. 3 is a flow diagram for second screen mediation on workstation 200 in accordance with some embodiments. In one embodiment, the functionality of the flow diagram of FIG. 3 and FIGS. 4-5, below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 305, a user may log into enterprise application 202 by starting application 202 on workstation 200. To interact with data on server 260, at 310, a workstation session is started by instituting an exchange with server 260, using one or more of the available APIs. For example, a workstation session may begin by authenticating a user by security API 274. After initiating the workstation session, typically a user would begin or continue working on a particular project. The project may have many information screens providing relevant business intelligence available to the user for project tracking, design, performance, history, and the like. At 315, second screen integration is started. Application 202 or workflow manager 264 may identify items in the project workflow that may be synchronized to a second screen, such as device 230. At 320, navigation and data context information is sent to a mediation service on server 260 via mediation API 278. Such information provides the mediation service with information on what is being accessed and displayed on workstation 200 so that second screen integration 238 on device 230 may be cross-notified to display related data.

Figure 4:
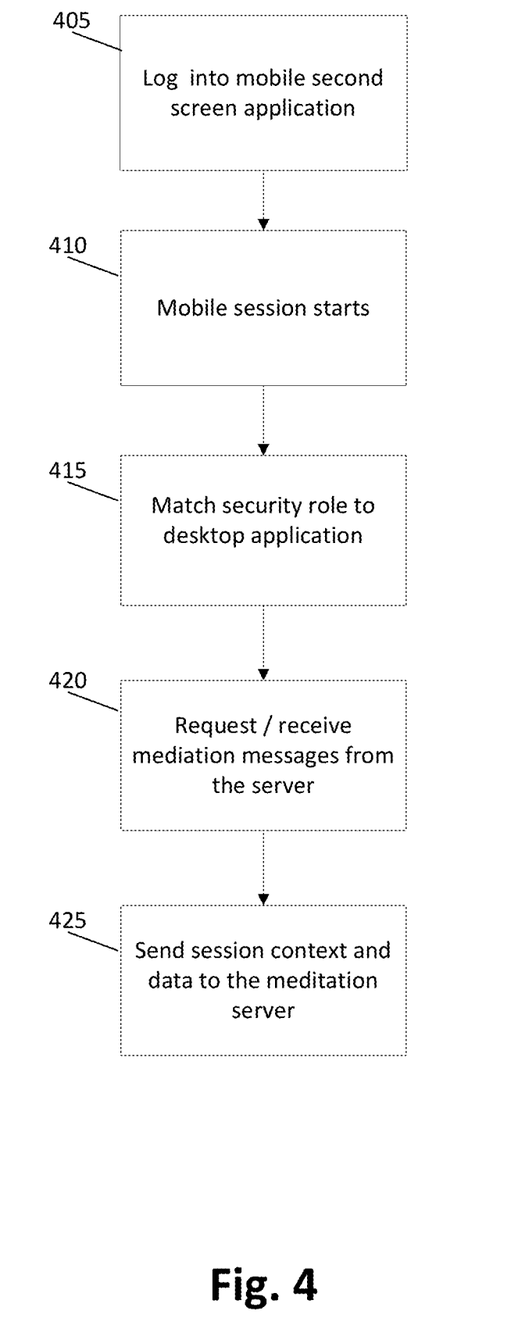
FIG. 4 is a flow diagram for second screen mediation on a portable device in accordance with some embodiments.

FIG. 4 is a flow diagram for second screen mediation on portable device 230 in accordance with some embodiments. At 405, a user may log into second screen application 232 by starting application 232 on device 230. To interact with data on server 260, at 410, a mobile session is started by instituting an exchange with server 260, using one or more of the available APIs. For example, a mobile session may begin by authenticating a user by security API 274. At 415, a security role is verified for the user of device 230 as the same security role as the user of workstation 200. In addition to security role verification, security API 274 may also verify that the actual user logged into both workstation 200 and device 230 is the same user. In some embodiments, such as when a mobile user connects via a public network, the security role assigned to device 230 may provide more restrictive permissions than the security role assigned to workstation 200. If so, second screen mediation service 268 may be used in conjunction with workflow manager 264 to target information to display on the second screen without attempting to exceed the permissions granted to the security role provided at 415. At 420, mediation messages are transmitted to and from server 260 through interface APIs 262. Upon initiating the mobile session, typically a user would turn back to a project on workstation 200. Meanwhile mediation messages are requested and received from server 260. Such mediation messages may include information on the current state of workstation 200 and enterprise application 202, e.g., what a user is displaying on workstation 200. Such mediation messages may also include information that should be displayed on device 230 and may be generated by Workflow manager 264 and second screen mediation service 268 based on the state of workstation 200 and application 202. At 425, session context information and data may be sent to server 260. Such session context information may include information related to how a user interacts with device 230. For example, a user may interact with second screen application 232 to choose information to view on device 230. When the user moves from one information context to another, corresponding updates may appear on workstation 200 reflecting the navigation of the user on device 230. Thus, both workstation 200 and device 230 may cross-notify each other to display related data or to maintain an awareness of where a user has navigated in the workflow provided by workflow manager 264.

Figure 5:
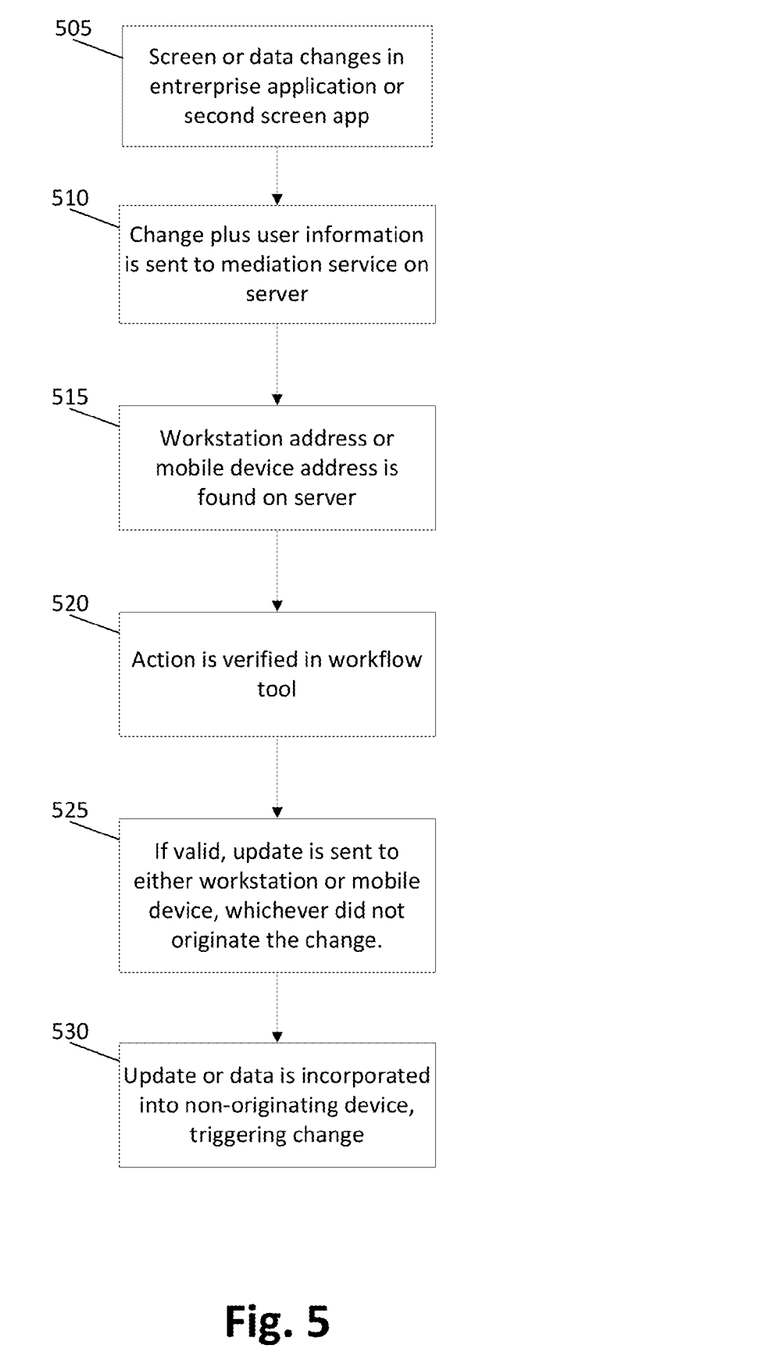
FIG. 5 is a flow diagram for second screen mediation on a server when a screen or data changes in either a linked workstation or linked portable device in accordance with some embodiments

FIG. 5 is a flow diagram for second screen mediation on server 260 when a screen or data changes in either linked workstation 200 or linked device 230 in accordance with some embodiments. At 505 a screen or data has changed on one or both of workstation 200 or device 230. At 510, when a change is made on either workstation 200 or device 230, the computer where the change occurs sends change information and user identification information, such as session information, to mediation service 268 on server 260. The change information is received at mediation service 268. At 515, mediation service 268 looks up an address for the non-originating computer, either workstation 200 or device 230, for notifying of the change. At 520, the action or updated data is verified in workflow manager 264. At 525, if the action or data is valid, an update is sent to the non-originating computer, reporting the action or change to the non-originating computer. At 530, the non-originating computer, either workstation 200 or device 230, may incorporate the action or update to process a corresponding change. For example, suppose a user is viewing a product's sales projection on second screen device 230 based on a growth rate of 15%, where the growth rate is entered on workstation 200. The user may change the growth rate to 17% at workstation 200, thereby triggering an event notification to non-originating second screen device 230, which may then update the sales projections based on the new growth rate number. Likewise, if the user instead changes the growth rate to 17% on second screen device 230, updating the sales projection directly, device 230 can trigger an event notification to non-originating workstation 200 causing an update to the field for growth rate to change from 15% to 17% automatically.

As disclosed, embodiments manage second screen mediation between a workstation and a portable or mobile device. Workstations provide applications that support second screens by providing an interface to send and receive second screen data as well as application flow points to send related screen information to the screen of the portable device. Portable devices provide applications that send and receive second screen data and provide the logic for displaying second screen data on the portable device. An enterprise server running a second screen mediation manager may authenticate and link workstation applications to second screen devices and provide state information from one device to the other. Thus, an enterprise-level second screen information system is provided with security scoped access to business intelligence to a second screen using a second screen mediation manager. The second screen mediation manager can provide in-context screen views on a second screen that are related to an application view on a primary screen. Further, the second screen mediation manager can cause an automatic update on one screen when the other linked screen is updated by a user.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to mediate a second screen session, the mediating comprising:
   authenticating a first session for a first application running on a workstation, the workstation having a first display and being configured to allow a user to interact with aspects of the first application shown on the first display;
   authenticating a second session for a second application running on a second screen device, the second screen device having a second display and being configured to allow the user to interact with aspects of the second application shown on the second display;
   linking the first application to the second application;
   receiving data indicating that one of the linked first and second applications was changed by the user interacting with the workstation or the second screen device, respectively;
   providing update data to the other of the linked first and second applications corresponding to the change by the user; and
   causing the respective display associated with the other of the linked first and second applications to update based on the update data.

2. The non-transitory computer readable medium of claim 1, the mediating further comprising:
   causing display properties of the first application to swap with display properties of the second application, wherein after the swap the second screen device displays substantially the same data as previously displayed on the workstation.

3. The non-transitory computer readable medium of claim 1, the mediating further comprising:
   sending configuration data to the linked first application, wherein the configuration data includes screen mappings and options for the second display of the second screen device.

4. The non-transitory computer readable medium of claim 1, the mediating further comprising:
   assigning the workstation a first permission scope for organization data access based on the authenticated first session;
   assigning the second screen device a second permission scope for organization data access based on the authenticated second session;
   providing data according to the first permission scope to the linked first application;
   providing data according to the second permission scope to the linked second application.

5. The non-transitory computer readable medium of claim 4, wherein the second permission scope is more restrictive than the first permission scope.

6. The non-transitory computer readable medium of claim 1, wherein the first application is an enterprise application.

7. A computer-implemented method of mediating a second screen session comprising:
   authenticating a first session for a first application running on a workstation, the workstation having a first display and being configured to allow a user to interact with aspects of the first application shown on the first display;
   authenticating a second session for a second application running on a second screen device, the second screen device having a second display and being configured to allow the user to interact with aspects of the second application shown on the second display;
   linking the first application to the second application;
   receiving data indicating that one of the linked first and second applications was changed by the user interacting with the workstation or the second screen device, respectively;
   providing update data to the other of the linked first and second applications corresponding to the change by the user; and
   causing the respective display associated with the other of the linked first and second applications to update based on the update data.

8. The method of claim 7, further comprising:
   causing display properties of the first application to swap with display properties of the second application, wherein after the swap the second screen device displays substantially the same data as previously displayed on the workstation.

9. The method of claim 7, further comprising:
   sending configuration data to the linked first application, wherein the configuration data includes screen mappings and options for the second display of the second screen device.

10. The method of claim 7, further comprising:
    assigning the workstation a first permission scope for organization data access based on the authenticated first session;
    assigning the second screen device a second permission scope for organization data access based on the authenticated second session;
    providing data according to the first permission scope to the linked first application;
    providing data according to the second permission scope to the linked second application.

11. The method of claim 10, wherein the second permission scope is more restrictive than the first permission scope.

12. The method of claim 7, wherein the first application is an enterprise application.

13. A system for mediating a second screen session, the system comprising:
    an authenticator that authenticates a first session for a first application running on a workstation, and authenticates a second session for a second application running on a second screen device, the workstation having a first display and being configured to allow a user to interact with aspects of the first application shown on the first display, the second screen device having a second display and being configured to allow the user to interact with aspects of the second application shown on the second display;

an application linker that links the first application to the second application;

a data receiver that receives data indicating that one of the linked first and second applications was changed by the user interacting with the workstation or the second screen device, respectively; and a data transmitter that provides update data to the other of the linked first and second applications corresponding to the change by the user, and causes the respective display associated with the other of the linked first and second applications to update based on the update data.

14. The system of claim 13, wherein the data transmitter causes display properties of the first application to swap with display properties of the second application, wherein after the swap the second screen device displays substantially the same data as previously displayed on the workstation.

15. The system of claim 13, further comprising:

a configurator that sends configuration data to the linked first application, wherein the configuration data includes screen mappings and options for the second display of the second screen device.

16. The system of claim 13, further comprising:

an assignor that assigns the workstation a first permission scope for organization data access based on the authenticated first session, and assigns the second screen device a second permission scope for organization data access based on the authenticated second session;

wherein the data transmitter provides data according to the first permission scope to the linked first application, and provides data according to the second permission scope to the linked second application.

17. The system of claim 13, wherein the first application is an enterprise application.

18. The non-transitory computer readable medium of claim 1, wherein the second display of the second screen device shows data in a different format or shows additional data from that shown by the first display of the workstation.

* * * * *

UNITED STATES PATENT AND TRADEMARK OFFICE
CERTIFICATE OF CORRECTION

| | | |
|---|---|---|
| PATENT NO. | : 9,148,425 B2 | Page 1 of 1 |
| APPLICATION NO. | : 13/975042 | |
| DATED | : September 29, 2015 | |
| INVENTOR(S) | : Rowe et al. | |

It is certified that error appears in the above-identified patent and that said Letters Patent is hereby corrected as shown below:

In the specification

Column 2, line 8, delete "embodiments" and insert -- embodiments. --, therefor.

Column 3, line 52, after "into" delete "an a" and insert -- a --, therefor.

Column 4, line 35, delete "202" and insert -- 202. --, therefor.

Signed and Sealed this
Seventh Day of June, 2016

Michelle K. Lee
*Director of the United States Patent and Trademark Office*